United States Patent [19]

Gibola et al.

[11] Patent Number: 5,590,228
[45] Date of Patent: Dec. 31, 1996

[54] RATCHET LOCK CONNECTOR INTERLOCKING MECHANISM

[75] Inventors: Norbert Gibola, Canyon Country; Mehrad Ghara, Tarzana, both of Calif.

[73] Assignee: Packard Hughes Interconnect Company, Irvine, Calif.

[21] Appl. No.: 525,471

[22] Filed: Sep. 8, 1995

[51] Int. Cl.$^6$ ..................................... G02B 6/38
[52] U.S. Cl. ........................ 385/56; 385/75; 439/312
[58] Field of Search ................... 385/53, 55, 56, 385/58, 60, 75; 439/312, 313, 320–323

[56] References Cited

U.S. PATENT DOCUMENTS

| | | | |
|---|---|---|---|
| 5,028,114 | 7/1991 | Krausse et al. | 385/58 |
| 5,030,120 | 7/1991 | Hartley | 439/144 |
| 5,038,524 | 8/1991 | Moulin | 451/548 |
| 5,141,448 | 8/1992 | Mattingly et al. | 439/314 |
| 5,246,379 | 9/1993 | Wright | 439/321 |
| 5,265,182 | 11/1993 | Hartley | 385/77 |
| 5,337,386 | 8/1994 | Noll et al. | 385/60 |
| 5,399,096 | 3/1995 | Quillet et al. | 439/321 |
| 5,450,509 | 9/1995 | Davis | 385/26 |

*Primary Examiner*—John D. Lee
*Attorney, Agent, or Firm*—Cary W. Brooks

[57] ABSTRACT

The invention includes a connector for fiber optic and electrical connectors. The connector includes a plug assembly having a plug housing, an inner coupling ring received over the plug housing and an outer ring actuator received over the inner coupling ring. The plug housing includes a ratchet provided by a series of teeth formed on the outer annular surface of the plug housing. A locking ratchet pawl is pivotally carried in the inner coupling ring and positioned to catch on the teeth on the plug housing when the inner coupling ring is rotated in one direction. The outer ring actuator has a key formed on an inner wall for engaging one end of the ratchet pawl and pivoting the pawl to an unlocked position. The inner locking ring has threads formed along a portion of an inside wall. A receptacle mating component is provided having a cylindrical-shaped nipple defining a socket portion for receiving a portion of the plug housing therein and said cylindrical-shaped nipple portion having threads formed on an outer wall being complementary to the threads formed on the inner wall of the inner coupling ring.

3 Claims, 2 Drawing Sheets

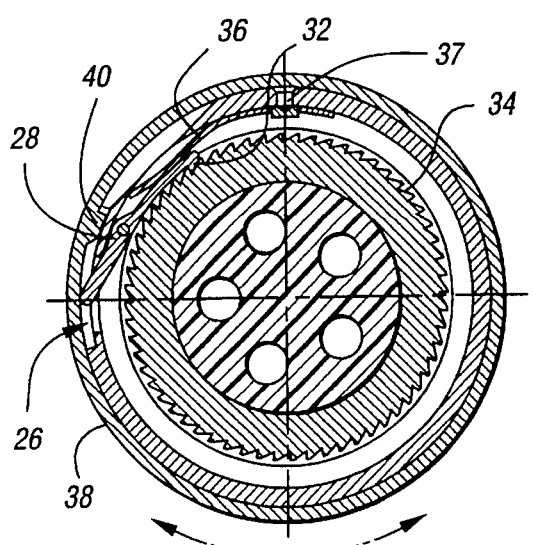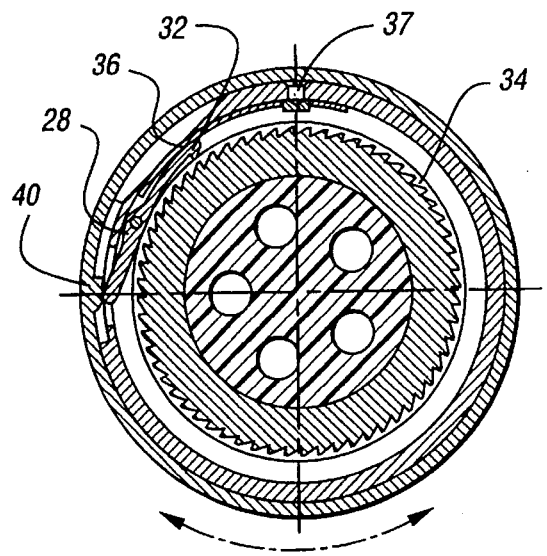
FIG. 2  FIG. 3
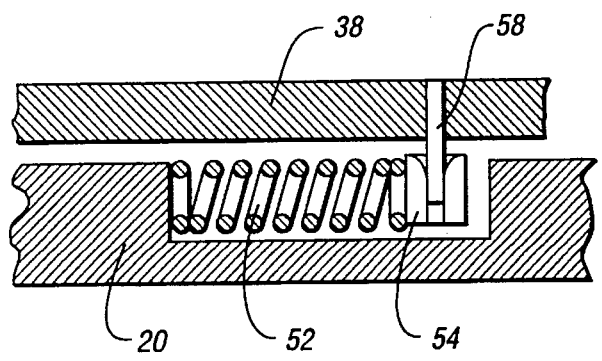
FIG. 4
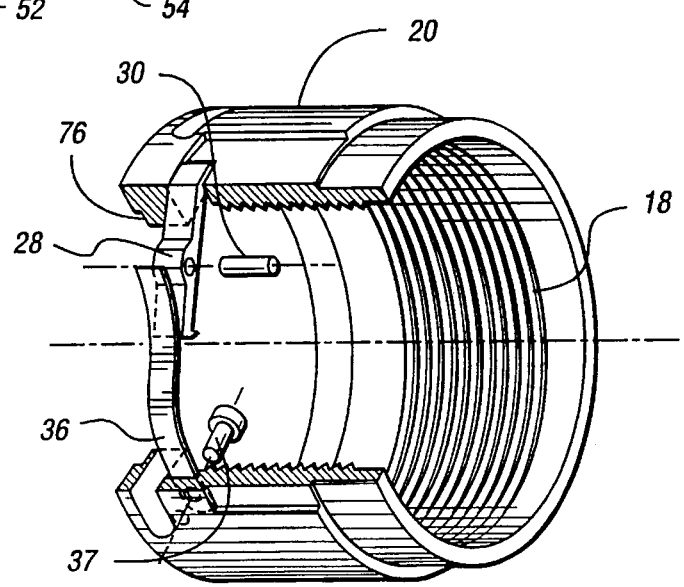
FIG. 5

100

RATCHET LOCK CONNECTOR INTERLOCKING MECHANISM

FIELD OF THE INVENTION

This invention relates to mating connectors for fiber optic or electrical applications.

BACKGROUND OF THE INVENTION

A variety of connectors for mating fiber optic or electrical lines are known. One type of such connector includes a plug component and a receptacle component that are threaded together. However, many of these connector systems become inadvertently unmated during extreme vibration or shock conditions.

There have been several attempts to solve this problem. The known prior arts mainly utilize a spring loaded "bump" internal to a coupling ring or sleeve added over the plug or receptacle component. This bump is either attached to the coupling ring or "keyed" into the coupling ring so that it rotates along with the coupling ring when the components are mated and unmated. This spring loading of the bump, presses the bump downward over a serrated surface of a stationary plug component which provides some degree of resistance to freely turning the coupling ring in mating and unmating directions. However, in most cases the resistance to unmating is not strong enough to prevent the mated component halves from unmating when exposed to dynamic environments. If the spring load is increased to prevent unmating, there is an increase in wear between the plug component serration and the coupling ring bump, resulting in unreliable durability of the connector.

The present invention provides advantages over the prior art.

SUMMARY OF THE INVENTION

The invention includes a connector for fiber optic and electrical lines. The connector includes a plug assembly and a receptacle mating component. The plug assembly includes a plug housing, an inner coupling ring received over the plug housing and an outer ring actuator received over the inner coupling ring. The plug assembly includes a fiber optic or electrical line therein. The plug housing also includes a ratchet provided by a series of teeth formed on the outer annular surface of the plug housing. A locking ratchet pawl is pivotally carried in an inner coupling ring and positioned to catch on the teeth of the plug housing when the inner coupling ring is rotated in one direction. An outer ring actuator has a key formed on an inner wall for engaging one end of the ratchet pawl and pivoting the pawl to an unlocked position. An inner locking ring has threads formed along a portion of an inside wall. A receptacle mating component includes a cylindrical-shaped nipple defining a socket portion for receiving a portion of the plug housing therein. The cylindrical-shaped nipple portion has threads formed on an outer wall being complementary to the threads formed on the inner wall of the inner coupling ring. The receptacle mating component carries a fiber optic or electrical line. The receptacle mating component may be threaded into the inner coupling ring to join the corresponding fiber optic or electrical lines carried in the plug assembly and receptacle mating component.

These and other objects, features and advantages of the present invention will become apparent from the following brief description of the drawings, detailed description and appended claims and drawings.

BRIEF DESCRIPTION OF THE DRAWINGS

FIG. 2 is a sectional view of a plug assembly with the ratchet in a locked position according to the present invention;

FIG. 3 is a sectional view taken of a plug assembly with the ratchet in an open position according to the present invention in an unlocked condition;

FIG. 4 is a sectional view illustrating the spring assembly of the inner coupling ring shown in FIG. 1 according to the present invention;

FIG. 5 is an enlarged view of an inner coupling ring with portions removed according to the present invention.

DETAILED DESCRIPTION

Figure 1:
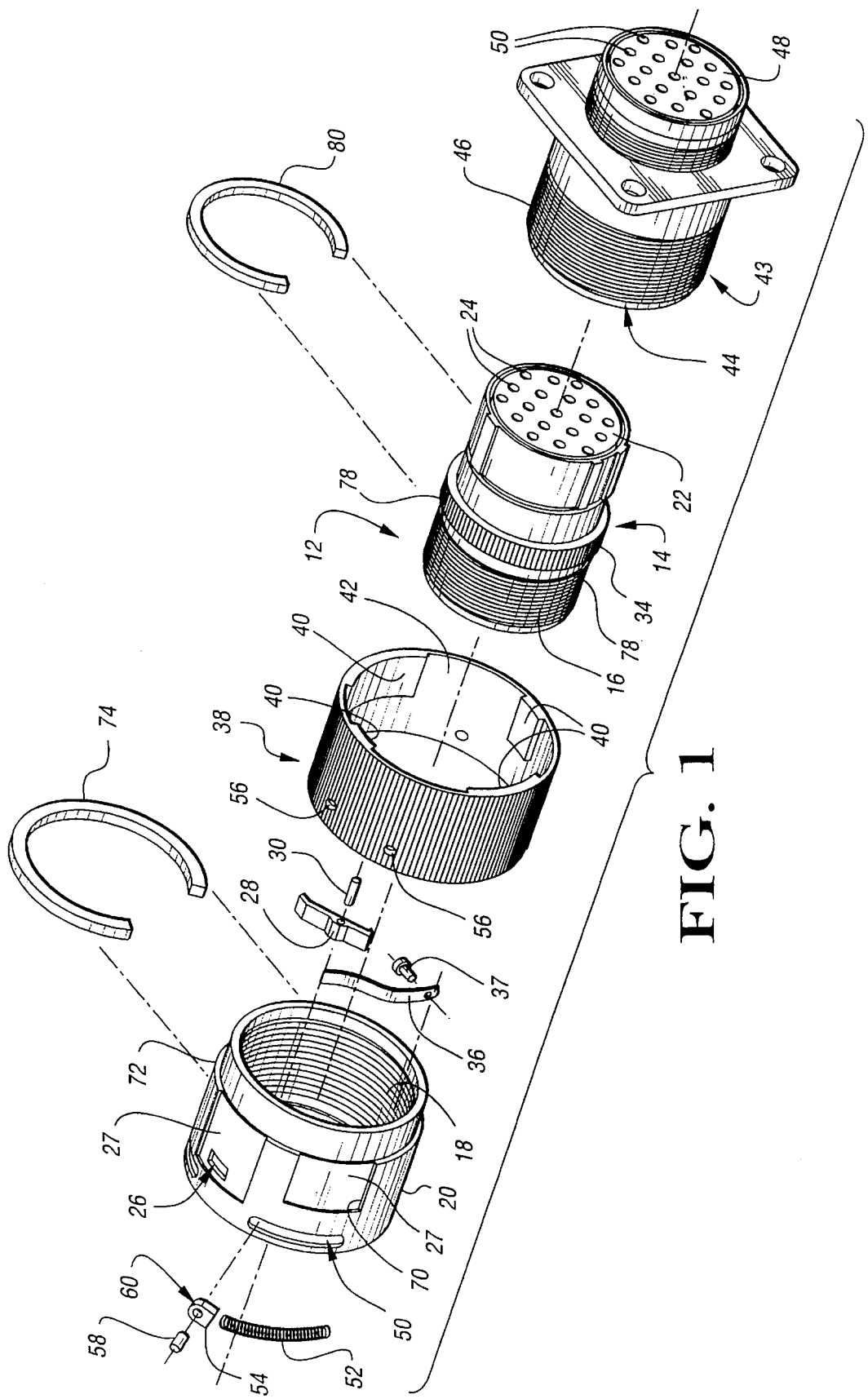
FIG. 1 is an exploded, sectional view of a connector system according to the present invention.

FIG. 1 illustrates a connector system according to the present invention including a plug assembly 10 having cylindrical-shaped plug housing 12 having a ratchet 14 formed on the outer surface thereof by a series of teeth formed along a portion of the annular surface of the plug housing. All the teeth have a slope surface on the same side (FIGS. 2 and 3). The plug housing 12 has a threaded portion 16 on its outer surface for mating to additional accessories not shown. The plug housing carries an insert 22 having a plurality of cavities 24 formed therein for receiving a fiber optic or electric line. The inner coupling ring 20 is received over the plug housing 12. A window 26 is provided in the inner coupling ring along the annular surface thereof as well as a plurality of keyways 27. A ratchet arm 28 is pivotally connected to the coupling ring by a pin 30. The ratchet arm is carried by the coupling ring and positioned so that one end of the ratchet arm may extend into a keyway 26. A pawl 32 extends from the other end of the ratchet arm 28 for engaging the teeth 34 on the plug housing 12 and preventing rotation of the inner coupling ring in one direction. A spring 36 is attached to the side wall of the inner coupling ring by a pin 38 for biasing the pawl 32 at the second end of the ratchet arm towards the teeth 34 on the plug housing 12.

An outer ring actuator 38 has a plurality of keys 40 extending outward from and spaced along the inside wall 42 of the outer ring actuator. The keys 40 extend into the keyways 29 and the keyway openings are larger than the keys 40 so that the outer ring actuator can be moved slightly without the keys engaging the inner coupling ring.

A receptacle mating component 42 is provided and has an outwardly extending nipple 44 having a threaded portion 46. The nipple has a socket formed therein. The receptacle mating component has an insert 48 having cavities 50 formed therein for receiving a fiber optic or electrical line. The threaded portion 46 is complementary to the threaded portion 18 formed on the inside wall of the inner coupling ring 20 for mating with the same. A portion of the plug housing is received in the socket formed in the nipple.

The inner coupling ring 20 has a slot formed in the outer surface thereof for carrying a compression spring 52 having a stop 54 attached at one end. The outer ring actuator 38 has a hole 56 extending therethrough for receiving a pin 58 that is received in a recess 60 formed in the stop 54. The compression spring 52 biases the outer ring actuator 38 in one direction so that a key 40 on the inside wall of the outer ring actuator 38 is biased away from the ratchet arm 28 and so that the outer actuator ring 40 cannot be inadvertently vibrated to a position engaging the ratchet arm 28 and moving the pawl 32 to an unlocked position.

For assembly, the outer ring actuator 38 is slid over the inner coupling ring 20 until the keys 40 engage an edge 70 defining a keyway 27. The inner coupling ring 20 has an annular groove 72 formed in an outer surface into which a C-ring 74 is clipped to hold the outer ring actuator 38 in place. The assembled outer ring actuator 38 and inner ring coupling 20 are slid over the plug housing 12 until the teeth 34 on the plug housing 12 engage a shoulder 76 formed on an inside wall of the inner ring coupling 20. The plug housing 12 has an annular groove 78 formed in an outer surface into which a C-ring 80 is clipped to hold the outer ring actuator 38 and inner ring coupling 20 in place and to form the plug assembly.

In operation, the components may be mated by bringing the plug assembly and the receptacle mating component together and rotating the outer ring actuator in a clockwise direction causing a first key 40 of the outer ring actuator to engage the first end of the ratchet arm 28 and the other keys engage an edge of the coupling ring defining the keyway 27 so that the outer ring actuator and inner coupling ring move in unison in a clockwise direction and so that the inner coupling ring 20 may be threaded onto the nipple 44 of the receptacle mating component. During the mating process the pivoting ratchet arm pawl 32 slides over the plug housing ratchet engagement teeth 34 smoothly due to the gradual slope of the engaging teeth in the clockwise turning direction. As the inner coupling ring is advanced towards the receptacle mating component, the two fiber optic or electrical lines are eventually mated.

The connector may be unmated by turning the outer ring actuator in a counterclockwise direction. Due to the key/keyway arrangement of the outer ring actuator and inner coupling ring, the outer ring actuator will travel freely approximately ten degrees. At this point a key 40 on the outer ring actuator engages the first end of the ratchet arm forcing it downward towards the center of the connector. The pivoting action lifts the pawl 32 section of the arm up, disengaging it from the plug housing teeth as shown in FIG. 4. At this point, further counterclockwise turning of the outer ring actuator causes free rotation of the threaded coupling relative to the plug housing, unmating it from the receptacle mating component.

When the outer ring actuator is not rotated in a counterclockwise direction, the spring 38 attached to the inside wall of the inner coupling ring supplies sufficient force to lock the ratchet pawl 32 against the teeth 34 on the plug housing thus preventing the inner coupling ring from rotating in a clockwise direction during extreme vibration or shock conditions thus unmating the connector components. As can be appreciated, the various components of this invention may be interchangeable so that relative movement of one part with respect to the other in a manner other than that described above are still equivalent and are within the scope of this invention.

What is claimed is:

1. A ratchet lock connector comprising:

a receptacle mating component having an outwardly extending nipple and a socket defined therein, a first communication line having a connector on a free end and the line carried by the receptacle mating component and extending into said socket, and threads formed on an outer surface of said nipple;

a cylindrical-shaped plug housing having a first end constructed and arranged to be received in said socket, said plug housing carrying a second communication line having a connector thereon for engagement with the connector on said first communication line, said plug housing having a plurality of teeth formed on an annular outer surface of the plug housing, said teeth being sloped in one direction;

an inner coupling ring being received on said housing, said inner coupling ring having an inner wall with threads formed thereon complementary to the threads formed on said nipple and said threads being spaced a distance from said plug housing, said inner coupling ring having keyways formed therethrough in an annular direction, a ratchet arm pivotally carried by said inner coupling ring so that a first end of the arm may be pivoted into a keyway and a second end of the arm pivoted towards the center axis of the inner coupling ring, said ratchet arm having a pawl extending from one end thereof for engaging the teeth on the plug housing;

an outer ring actuator having a plurality of keys formed along an inside wall of the outer ring actuator, each key extending into a respective keyway formed in the inner coupling ring; said inner coupling ring having a spring attached to the inside wall thereof and engaging said second end of the ratchet arm to bias said pawl towards the center axis of the inner coupling ring and towards the teeth on said plug housing;

wherein said plug housing and said receptacle mating component may be mated by bringing said plug housing and receptacle mating component together and turning the outer ring actuator in a clockwise direction causing said keys to engage the inner coupling ring and turning the inner coupling ring in the same direction causing the plug housing and the receptacle mating component to be threaded together and said first and second communication lines to be mated, and so that the pawl slides over the sloped edge of the teeth on the plug housing as the inner coupling ring is rotated in the clockwise direction;

and wherein said plug housing and receptacle mating component may be unmated by turning the outer ring actuator in a counterclockwise direction so that one of said keys engages the first end of the ratchet arm forcing it downward towards the center of the inner coupling ring causing the second end of the ratchet arm to disengage from the teeth on the plug housing and the other keys engage the inner coupling ring so that the inner coupling ring rotates in unison with the outer ring actuator so that the components may be unthreaded.

2. A ratchet lock connector as set forth in claim 1 wherein said first communication line and said second communication line are both fiber optic lines.

3. A ratchet lock connector as set forth in claim 1 wherein said inner coupling ring includes a slot formed in an outer surface thereof for carrying a compression spring having a stop attached at one end, and said outer ring actuator has a hole extending therethrough for receiving a portion of a pin at one end and the other portion of the pin received in a recess formed in said stop so that the compression spring biases the outer ring actuator in one direction so that a key on the inside wall of the outer ring actuator is biased away from the ratchet arm and so that the outer ring actuator cannot be inadvertently vibrated to a position engaging the ratchet arm and move the pawl to an unlocked position.

\* \* \* \* \*